(12) United States Patent
Dohogne et al.

(10) Patent No.: US 7,204,774 B2
(45) Date of Patent: Apr. 17, 2007

(54) ONE-PIECE DRIVE PULLEY AND BELT GUIDE

(75) Inventors: L. Ranney Dohogne, St. Louis, MO (US); Robert E. Wehrheim, Hazelwood, MO (US); Mark A. Fry, Glen Carbon, IL (US); Walter A. Stribling, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 179 days.

(21) Appl. No.: 10/847,432

(22) Filed: May 17, 2004

(65) Prior Publication Data

US 2005/0255949 A1   Nov. 17, 2005

(51) Int. Cl.
*F16H 55/36* (2006.01)
(52) U.S. Cl. ..................................... 474/168
(58) Field of Classification Search ............... 474/58, 474/62, 166, 167, 168, 170, 174, 175
See application file for complete search history.

(56) References Cited

U.S. PATENT DOCUMENTS

| 257,323 | A | | 5/1882 | Hartley |
| 373,389 | A | * | 11/1887 | Creager ..................... 198/824 |
| 857,370 | A | * | 6/1907 | Waechler .................... 198/824 |
| 1,443,782 | A | * | 1/1923 | Balcker ....................... 474/27 |
| 1,707,998 | A | * | 4/1929 | Shaw ........................ 198/824 |
| 1,728,372 | A | | 9/1929 | Shields |
| 1,846,665 | A | * | 2/1932 | Adams ....................... 474/107 |
| 2,553,439 | A | | 5/1951 | Carmichael |
| 2,655,252 | A | | 10/1953 | Spurgeon |
| 3,513,566 | A | | 5/1970 | Shacklock et al. |
| 3,965,765 | A | * | 6/1976 | Vaillette et al. ............. 474/166 |
| 3,987,683 | A | | 10/1976 | Singh |
| 4,086,707 | A | | 5/1978 | Bochan |
| 4,144,755 | A | | 3/1979 | Palloch et al. |
| 4,157,042 | A | * | 6/1979 | McMillan ..................... 474/13 |
| 4,170,175 | A | * | 10/1979 | Conlon, Jr. ................. 346/74.2 |
| 4,265,133 | A | * | 5/1981 | Van Der Meulen et al. .. 476/30 |
| 4,422,543 | A | * | 12/1983 | Stubbings ................... 198/782 |
| 4,488,363 | A | | 12/1984 | Jackson et al. |
| 4,546,554 | A | | 10/1985 | Bullock et al. |
| 4,554,962 | A | | 11/1985 | Wright |
| 4,591,476 | A | | 5/1986 | Greenwood et al. |
| 4,633,932 | A | | 1/1987 | Ferguson |
| 4,922,151 | A | | 5/1990 | Lewis |
| 4,929,219 | A | | 5/1990 | Baker |
| 4,958,676 | A | | 9/1990 | Kuntz |

(Continued)

FOREIGN PATENT DOCUMENTS

CH             445 060 A       10/1967

(Continued)

*Primary Examiner*—Vicky A. Johnson
(74) *Attorney, Agent, or Firm*—Harness, Dickey & Pierce, P.L.C.

(57) ABSTRACT

In one-piece combination, a drive pulley and belt guide for a belt-driven machine. The pulley has a belt-driving section configured for engagement by the belt and a belt-guiding section integral with the belt-driving section. The belt-guiding section has a conically-tapering external surface and an internal surface which is substantially free of reinforcing members and defines a hollow, cup-shaped interior free from structure within the interior.

20 Claims, 5 Drawing Sheets

U.S. PATENT DOCUMENTS

| | | |
|---|---|---|
| 5,129,146 A | 7/1992 | Kanemitsu et al. |
| 5,181,888 A | 1/1993 | Takahashi et al. |
| 5,195,241 A | 3/1993 | Bradfield et al. |
| 5,409,423 A * | 4/1995 | Ullrich et al. .............. 474/170 |
| 5,501,021 A | 3/1996 | Torborg et al. |
| 5,694,795 A | 12/1997 | Knopp |
| 6,053,832 A | 4/2000 | Saito |
| 6,273,244 B1 * | 8/2001 | Dingeldein et al. ......... 198/824 |
| 2002/0162627 A1 | 11/2002 | Dunlap |

FOREIGN PATENT DOCUMENTS

| | | |
|---|---|---|
| FR | 2 415 756 A | 8/1979 |
| GB | 1 130 864 A | 10/1968 |
| JP | 53 056455 A | 5/1978 |
| JP | 02 185292 A | 7/1990 |
| JP | 2000093687 A * | 4/2000 |

\* cited by examiner

ONE-PIECE DRIVE PULLEY AND BELT GUIDE

BACKGROUND OF THE INVENTION

This invention relates generally to belt driven machines, and in particular to a combined pulley and belt locator which transmits power to a drive belt and maintains the belt at a proper operating position.

Many appliances have an endless belt which transmits power and motion from a motor to a driven component. For example, an automatic clothes dryer has an electric motor which drives a flexible belt to rotate a drum containing wet clothing. A pulley is mounted along an end of a motor drive shaft and rotates with the shaft for moving the belt. The pulley typically is threaded onto a corresponding threaded portion of the shaft. The belt engages the pulley and is aligned with a belt-driving section of the pulley. A blower is also attached to the drive shaft for circulating air through the dryer to remove moisture from the clothing as it tumbles in the drum.

Unfortunately, the motor is frequently located in a dryer housing at a position which is not easily accessible nor in view. A person performing initial assembly of the dryer or subsequent maintenance must install the belt "blindly," without seeing the pulley. As a result, the belt may inadvertently be misaligned, or be installed around the shaft instead of the pulley. That produces improper belt tensions and uncertain speed ratios which reduce the life of the belt and lead to operational failure. To avoid these difficulties, a belt restrainer has frequently been installed on the shaft adjacent to the pulley. The belt restrainer, or belt guide, is typically a plastic shroud having an external surface sloping toward the pulley which, when rotated, causes a misplaced belt engaging the surface to move to its proper position on the pulley. The belt guide has an internal collar for mounting on the drive shaft and a series of internal ribs which support the structure of the shroud. An example of such a belt guide is described in U.S. Pat. No. 4,929,219, issued May 29, 1990 and entitled "Belt Locator For Locating A Belt On A Pulley."

The belt guide can lead to additional expense and delay. Workers occasionally forget to install a belt guide, or install it on the drive shaft in a backwards orientation with the surface sloping away from the pulley. A maintenance action is then required to remove the pulley from the shaft and properly install the belt guide. The plastic material of the belt guide can be less durable than other surrounding parts which are metallic. Moreover, the production costs associated for molding the plastic guide adds to the substantial costs already required for machining the pulley.

Production of the pulley can also be relatively inefficient. It is made from a solid piece of steel which is machined to define the complex geometry and to eliminate any sharp edges which could damage or destroy the belt. Pulleys have not typically been made by a die casting process because molded parts often exhibit discontinuities in surface contours (referred to as "parting lines") forming sharp edges which rapidly abrade the belt and lead to premature failure.

An additional shortcoming is that the pulley cannot be used for holding the drive shaft at a fixed position. To install or remove the blower from the drive shaft, the shaft must be held stationary while the blower is rotated for tightening or loosening its threaded connection. Because the pulley is threaded onto that shaft, it may not be used as a grip for preventing rotation of the shaft because its own threaded connection would be affected. Instead, a flat surface or a slot is typically machined into the shaft to facilitate holding the shaft with a tool. Unfortunately, the machining of the shaft degrades the strength and life of the shaft, increases manufacturing time, and limits the types of suitable materials for making the shaft.

SUMMARY OF THE INVENTION

Among the several objects and features of the present invention may be noted the provision of a pulley which prevents improper positioning of a driven belt; the provision of such a pulley which reduces maintenance actions; the provision of such a pulley which is integrally combined with a belt guide; the provision of such a pulley which is produced by molding and thereby avoids the need for machining; the provision of such a pulley which facilitates holding the drive shaft at a fixed position; the provision of such a pulley which is readily installed on a drive shaft; the provision of such a pulley which is economical; and the provision of such a pulley which is lightweight.

In general, a one-piece combination according to the present invention is a drive pulley and belt guide for a belt-driven machine. The combination comprises a one-piece body having a belt-driving section and a belt-guiding section. The belt-driving section includes a hub configured for engagement by a belt. First and second end walls are on the hub, and an internal passage extends through the hub. The belt-guiding section has an external surface which extends from the second end wall and flares conically outward from the second end wall to an end of the body. The belt-guiding section also has an internal surface which extends from the internal passage to the end of the body. The internal surface is substantially free of reinforcing members and defines a hollow, cup-shaped interior free of structure within the interior.

In another aspect, a system according to the present invention transmits power to a belt-driven device. The system comprises an electric motor, and a drive shaft connected to the motor for rotation on an axis. A pulley is mounted on the drive shaft. An endless belt engages the pulley and is supported for transmitting power to the device. The pulley has a belt-driving section configured for engagement by the belt and a belt-guiding section integral with the belt-driving section. The belt-guiding section has a conically-tapering external surface and an internal surface which is substantially free of reinforcing members and defines a hollow, cup-shaped interior free from structure within the interior. The pulley further has an internal tubular passage for receiving the drive shaft to mount the pulley on the shaft with the shaft extending through the passage. The shaft further extends through the interior of the belt-guiding section without contacting any structure therein.

Other objects and features of the present invention will be in part apparent and in part pointed out hereinafter.

BRIEF DESCRIPTION OF THE DRAWINGS

Corresponding reference characters indicate corresponding parts throughout the views of the drawings.

DETAILED DESCRIPTION OF THE PREFERRED EMBODIMENTS

Figure 1:
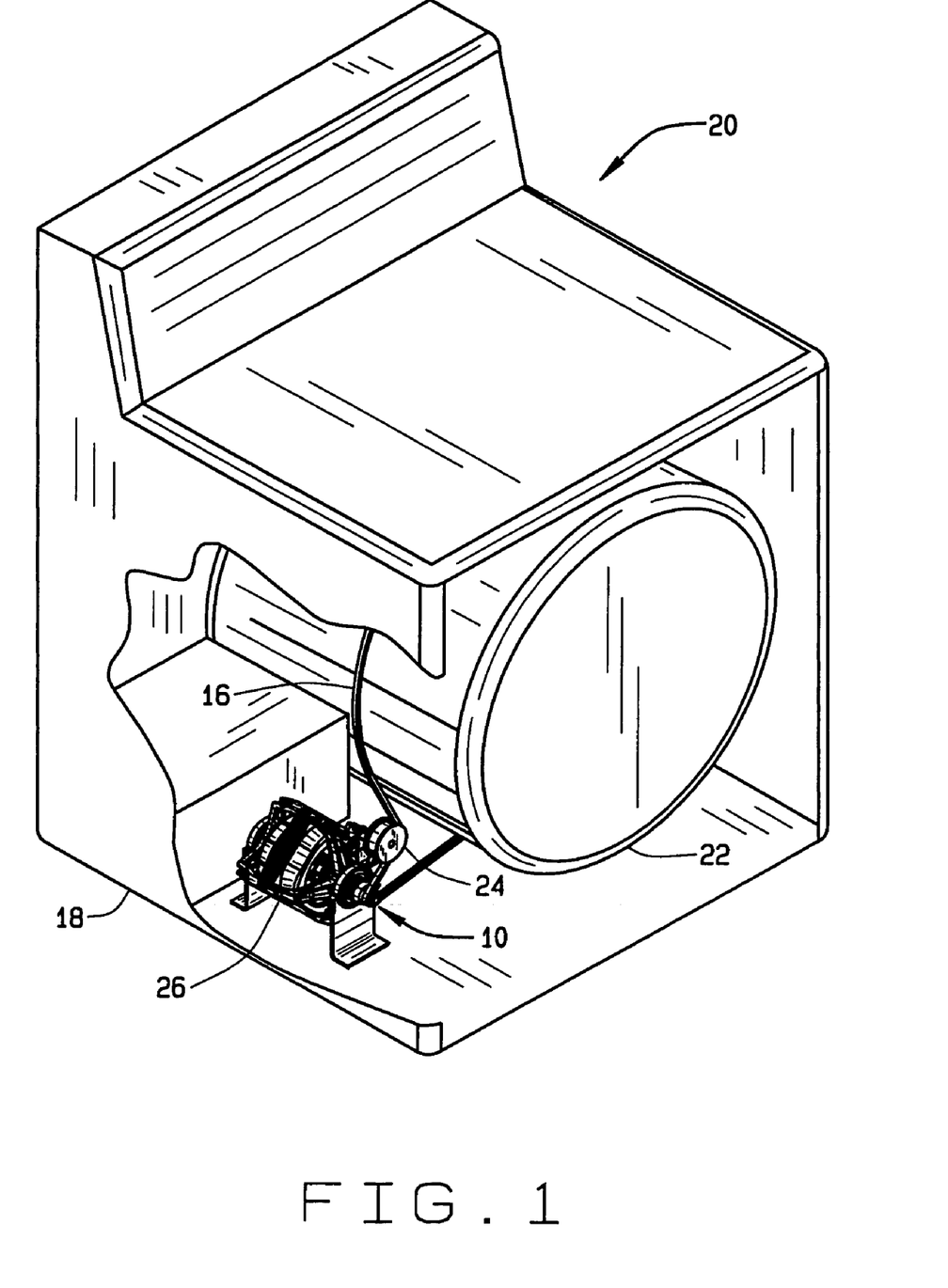
FIG. 1 is a schematic perspective of an automatic clothes dryer with portions partially broken away to show internal construction.
Figure 2:
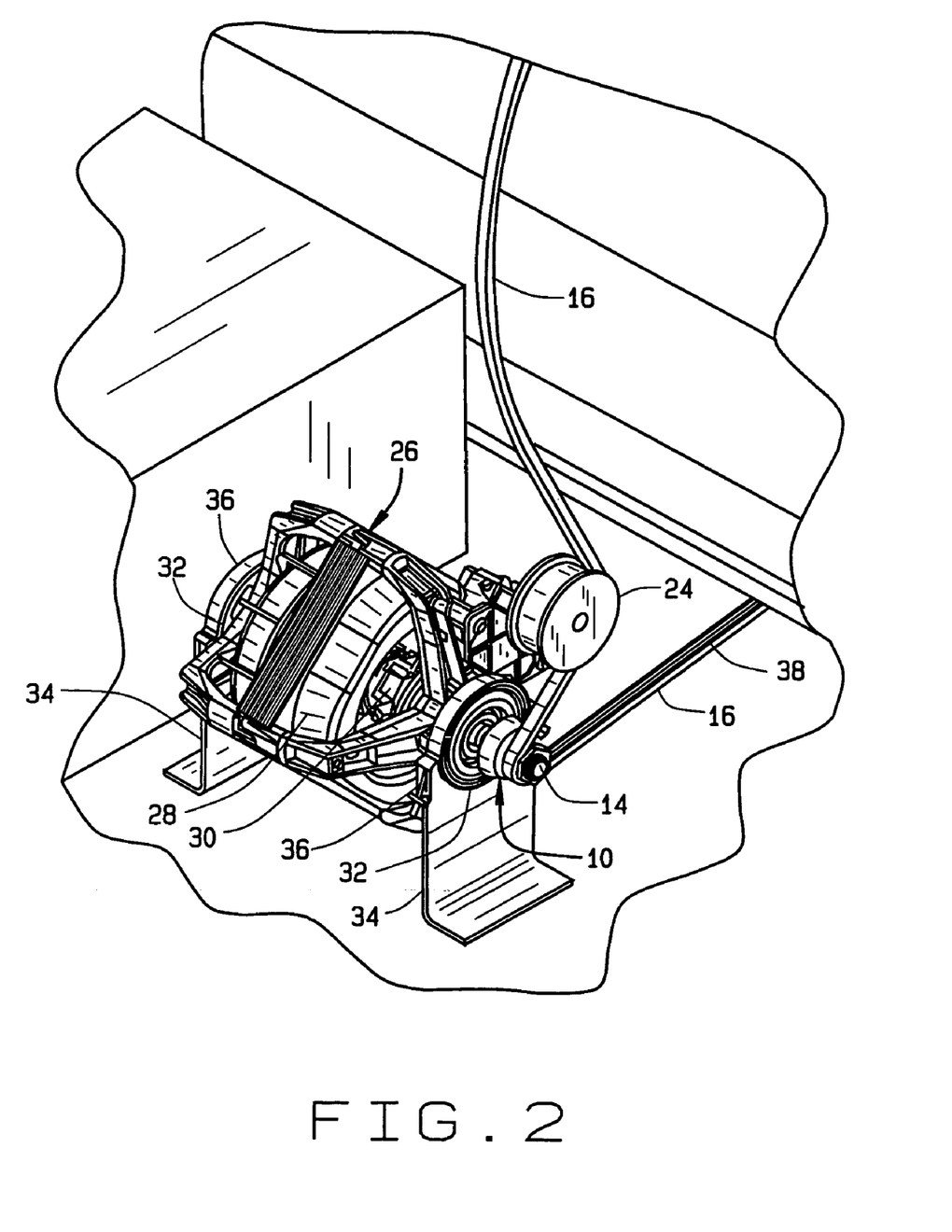
FIG. 2 is an enlarged portion of FIG. 1 showing an electric motor and belt.
Figure 3:
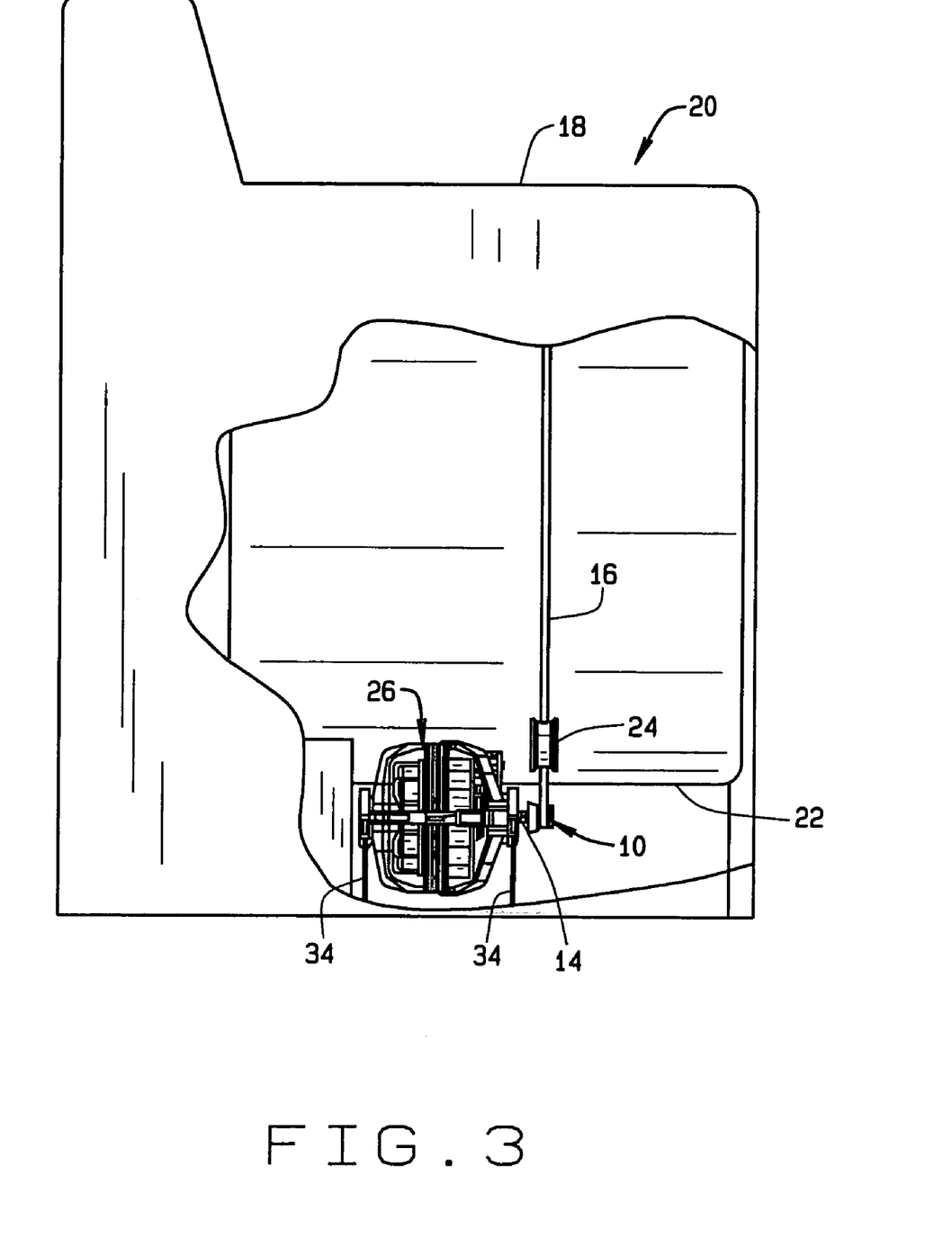
FIG. 3 is a side elevation of the clothes dryer.

Referring now to the drawings and in particular to FIGS. 1–3, a pulley according to the present invention is indicated generally at 10. The pulley 10 has a one-piece body which transmits power from a drive shaft 14 to a belt 16 and maintains the belt at a proper operating position.

In one embodiment, the pulley 10 is particularly suited for use in applications where the belt 16 may become positioned at an improper location relative to the pulley. Specifically, the pulley is intended for use inside the housing 18 of an automated clothes drying machine, or dryer 20, as shown in FIGS. 1–3. In that embodiment, the belt 16 must be installed blindly (i.e., without direct viewing) and is therefore more likely to be placed at an incorrect location. Further, the belt 16 is subject to vibrations and tension variations which can lead to its becoming dislodged from a correct location during operation of the dryer 20. Although the description herein is primarily with reference to that embodiment, it is understood that other applications, such as belt-driven machines for other applications or fields of industry, do not depart from the scope of this invention.

Referring to FIGS. 1–3, the dryer 20 includes a housing with a rotatable drum 22 for receiving wet clothing. The belt 16 is trained around an outer periphery of the drum 22 in frictional engagement therewith. An idler system 24 is provided for taking up any slack in the belt. The idler system includes a wheel rotatably mounted on a resilient arm such that the wheel is biased to tension the belt 16 and maintain an appropriate amount of tension on the belt so that rotation of the pulley 10 accomplishes rotation of the drum 22, as will be understood by those skilled in the art.

An electric motor 26 is mounted in the dryer housing 18 for driving the drum 22. The motor 26 is conventional and, as known to those skilled in the art, includes a stationary assembly, or stator 28 (FIG. 2), and a rotatable assembly, or rotor 30. The stator 28 is generally annular and holds one or more wire-wound coils, or windings (not shown). When energized with electrical current, the windings magnetically interact with the rotor to produce torque. The torque is transmitted to the horizontal drive shaft 14. The motor 26 is elevated from the bottom of the housing 18 and is mounted on two hub rings 32 positioned at opposite ends of the motor which are supported by two corresponding legs 34. The hub rings 32 have suitable material (e.g., rubber) for absorbing shocks and damping vibrations. Each hub ring 32 is placed in a crescent shaped cradle on a corresponding leg 34. A thin metallic clip 36 is installed above each hub ring 32 to secure it to the leg 34.

The drive shaft 14 extends to a rear portion of the housing 18 to drive a blower (not shown) to circulate air through the dryer 20. The blower induces ambient air to be drawn through an inlet port (not shown). The air is heated and directed into the drum 22 for contacting clothing and removing moisture from fabrics as clothing tumbles in the drum.

The belt 16 illustrated in the drawings is a multiple groove or "poly-V" belt which, on one face 38 (FIG. 2), has alternating ribs and grooves for being seated in and engaging corresponding formations on the pulley 10 for effective traction and minimum slippage of the belt on the pulley. The belt 16 is formed of a suitable flexible and durable material, such as rubber. It is supported for lengthwise movement in an endless path from the pulley 10, to the idler 24, around the drum 22 and back to the pulley for transmitting power to the drum for rotation. Although the pulley 10 is mounted on an end portion of the drive shaft 14, it may be located at any portion therealong.

Figure 4:
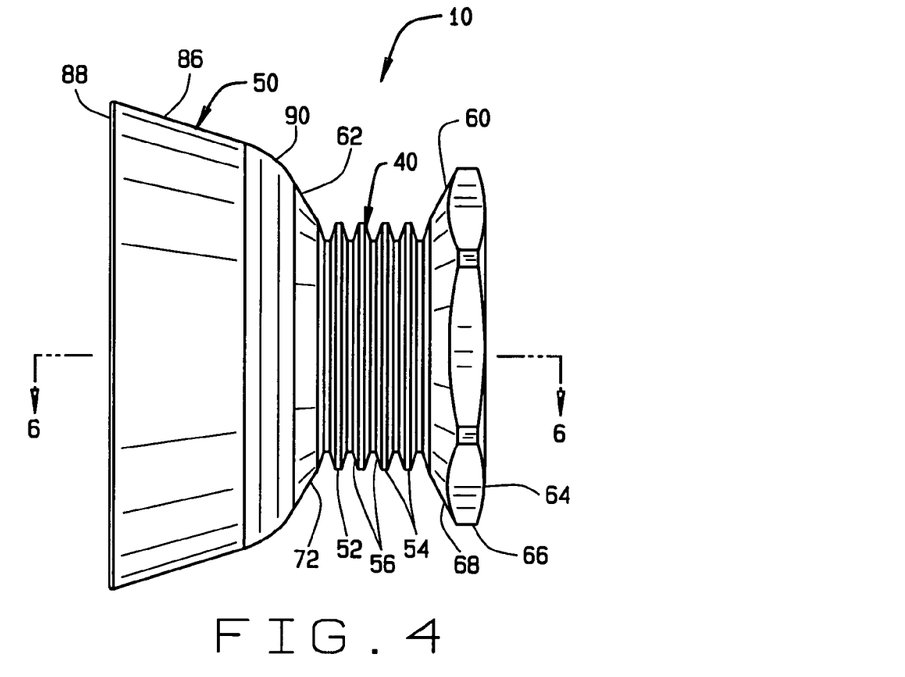
FIG. 4 is an enlarged side elevation of a one-piece pulley and belt guide combination.
Figure 5:
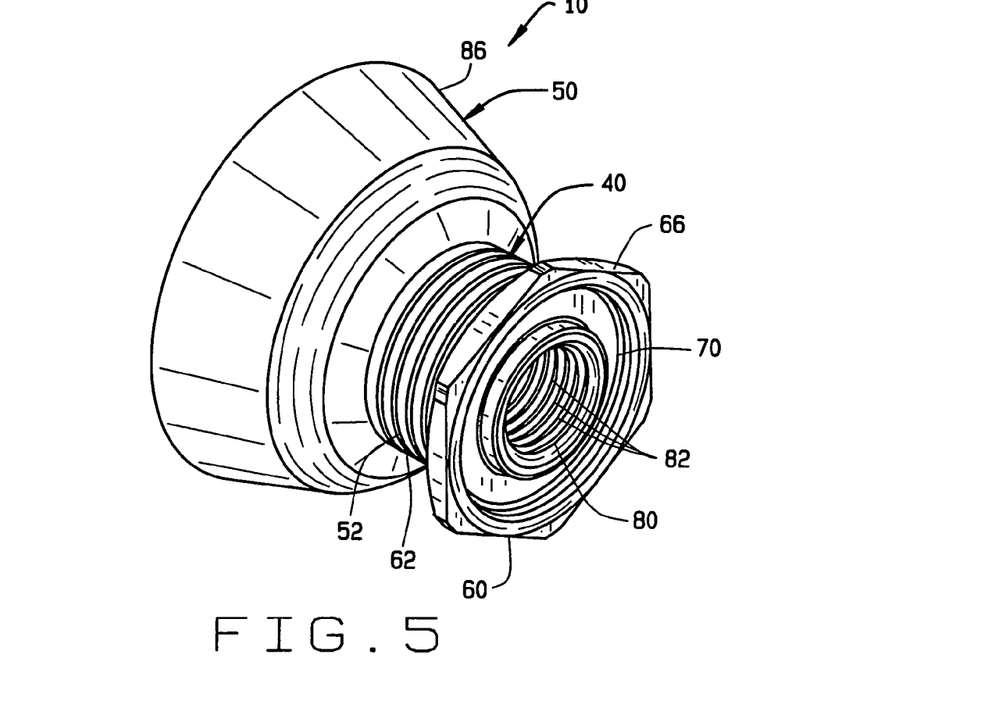
FIG. 5 is a perspective of the pulley of FIG. 4.
Figure 6:
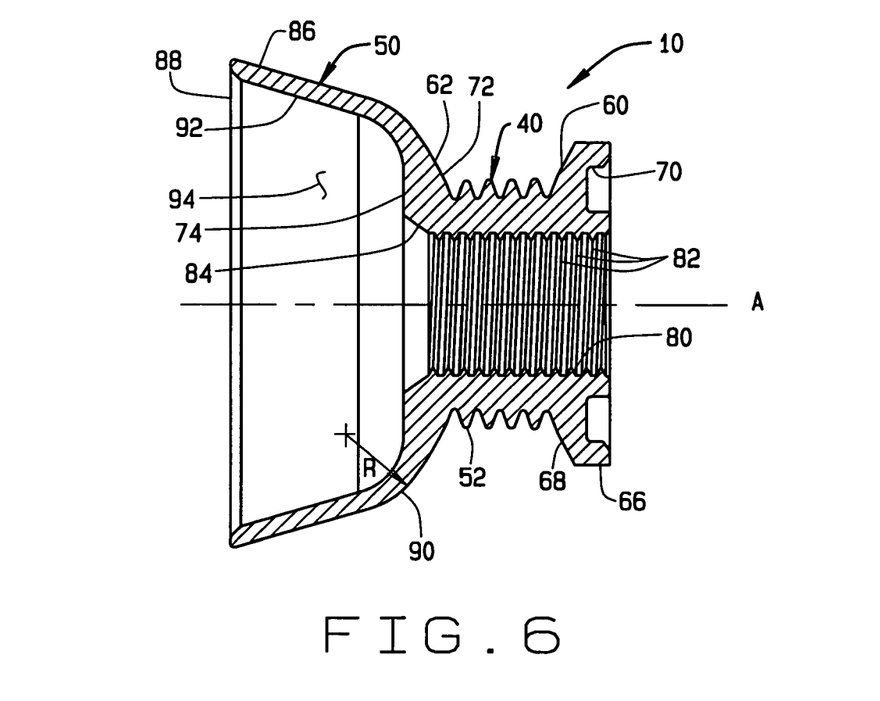
FIG. 6 is a section taken along line 6—6 of FIG. 4.

Referring to FIGS. 4–6, the pulley 10 has a one-piece construction which includes a belt-driving section (generally indicated at 40) for engagement by the belt 16 and a belt-guiding section (generally indicated at 50) for preventing incorrect placement of the belt and/or causing a misplaced belt to move toward the belt-driving section. The belt-driving section 40 comprises a generally cylindric hub 52 having a central axis A and an exterior formed with several annular ribs 54 and grooves 56 in an alternating arrangement for receiving corresponding formations on the belt 16. First and second end walls 60, 62 extend radially outward from the hub 52 adjacent opposite ends of the hub for containing the belt 16. The first (right in FIGS. 4–6) end wall 60 has an outer face 64, a peripheral edge 66, and an inner wall 68 which slopes from the peripheral edge to the hub 52. The peripheral edge 66 preferably has an external shape which is suitable for being gripped by a tool or by hand for being installed on the shaft 14. In the embodiment shown in the drawings, the peripheral edge 66 of the first end wall 60 is polygonal, more specifically, hexagonal. A groove 70 in the outer face 64 of the first end wall 60 reduces the weight of the body (and cost) by removal of unnecessary material. The second (left in FIGS. 4–6) end wall 62 has a conical inner face 72 and an outer face 74 (FIG. 6).

An internal passage 80 extends axially through the hub 52 for receiving a portion of the shaft 14 to mount the pulley 10 on the shaft. In the embodiment shown in FIG. 6, the internal passage 80 has screw threads 82 for engagement with corresponding screw threads (not shown) on the shaft 14. The end of the passage 80 adjacent the belt-guiding section 50 is countersunk to provide a smooth chamfered edge 84 (FIG. 6) to facilitate installing the pulley 10 on the shaft 14 and for weight reduction.

The belt-guiding section 50 extends from the second (left) end wall 62 of the hub 52. It has a conical external surface 86 which flares outward from the inner face 72 of the second end wall 62 to an end 88 of the body. The surface 86 and belt-guiding section 50 covers a portion of the drive shaft 14 to prevent the belt 16 from engaging that portion instead of the hub 52. Further, the belt guiding section 50 provides a self-alignment capability. If the belt 16 is at an incorrect position contacting the belt-guiding section 50, the belt will "walk" down the sloping external surface 86 to the correct position as the pulley 10 rotates. Because the pulley 10 is made in one-piece, the belt guide cannot be installed in a backwards orientation.

In the embodiments shown in the drawings (FIGS. 6 and 7), the external surface 86 of the belt-guiding section 50 has a smooth and continuous (uninterrupted) contour and is connected to the inner face 72 of the second end wall 62 by a smooth convex transition 90 having a radius R which transitions between the relatively steep slope of the second end wall 62 and the lesser slope of the external surface 86 of the belt-guiding section 50. Other arrangements, including non-convex or non-continuous surfaces, do not depart from the scope of this invention. The belt-guiding section 50 also has an internal surface 92 (FIG. 6) which extends from the internal passage 80 and outer face 74 of the second end wall 62 to the end 88 of the body. Significantly, the internal surface 92 is substantially free of reinforcing members and defines a hollow, cup-shaped interior 94 free from structure within the interior. That avoids manufacturing complexities, weight, and failure-prone components associated with a collar or ribbed structure inside a belt guide. Further, the shaft 14 can extend through the interior 94 of the belt-guiding section 50 without contacting any structure therein.

In one embodiment, the pulley 10 is produced by a die casting process to avoid the need for machining and thereby providing lower cost. An exemplary process is multi-slide diecast process which is proprietary to Dynacast International Limited, having international headquarters in Warwickshire, England and North American offices in Danbury, Conn. Further discussion of such a process is found in U.S. Pat. No. 4,633,932, issued Jan. 6, 1987, and entitled "Method and Apparatus For Forming an Internally Screw-Threaded Article." The process uses several (e.g., four) perpendicular slides to enable complex and accurate castings. The multi-slide process is effective for forming parts with complex geometries, especially an internally screw-threaded article, such as the pulley. It minimizes discontinuities in surface contours (referred to as "parting lines") which are frequently found on die cast parts and must be removed by machining. For the pulley 10, a discontinuity on or adjacent the ribs 54 of the belt-driving section 40 is of critical importance because it would abrade the belt 16 and lead to its failure.

The pulley 10 is made of a material suitable for molding and which exhibits high strength, durability and hardness, low cost raw material, and is resistant to corrosion. In one embodiment, the pulley 10 is made of zinc or a zinc alloy. It is understood that the pulley could be made of other materials without departing from the scope of this invention.

Figure 7:
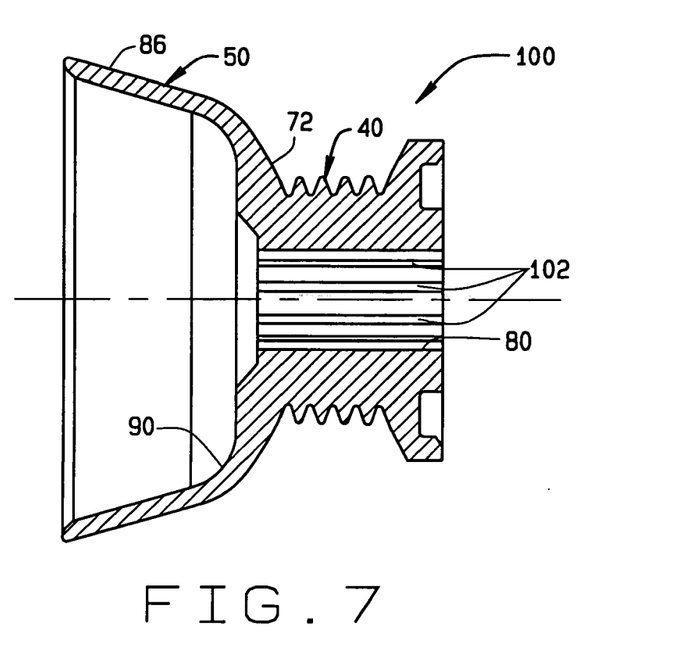
FIG. 7 is a section similar to FIG. 6 but for a pulley of a second embodiment.

An alternate embodiment 100 of the pulley which is press fit on a shaft is shown in FIG. 7. The internal passage 80 in the pulley 100 includes a plurality of straight-wall longitudinal splines 102 (e.g., six splines). It is understood that the number and/or configuration of splines may vary without departing from the scope of this invention. Splines 102 enable the pulley 10 to be press fit on an end of a drive shaft 14 having a corresponding splined geometry (not shown). The first end wall 60 may be used as a grip for holding the shaft 14 stationary and preventing its rotation while rotating the blower during installation to, or removal from, the opposite end of the shaft. Therefore, other than the external splines engaging the pulley, the shaft 14 does not need to have a flat surface, slot, or any deformation which is typically added, as known to those skilled in the art, to facilitate holding the shaft and which typically removes material from a cylindric shaft. Therefore, the shaft 14 of the present invention remains generally solid and cylindric which leaves it comparatively stronger. Moreover, manufacturing is more rapid, and the shaft 14 is not limited to a type of steel which is machinable.

Yet another embodiment (not shown) of the pulley has an internal passage 80 comprising a smooth bore which is press fit over an end of a drive shaft 14 having a splined geometry.

In view of the above, it will be seen that the several objects of the invention are achieved and other advantageous results obtained.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. In one-piece combination, a drive pulley and belt guide for a belt-driven machine, the combination comprising:
   a one-piece body having a belt-driving section and a belt-guiding section;
   said belt-driving section including a hub configured for engagement by a belt, first and second end walls on the hub, and an internal passage extending through the hub, the second end wall having a conical inner face;
   and said belt-guiding section extending from the conical inner face of the second end wall and including an external surface that flares conically outward to an end of the body, the belt-guiding section also having an internal surface which extends from said internal passage to said end of the body, the internal surface being substantially free of reinforcing members and defining a hollow, cup-shaped interior free of structure within the interior.

2. A combination as set forth in claim 1 wherein the internal passage has screw threads.

3. A combination as set forth in claim 1 wherein the internal passage has splines.

4. A combination as set forth in claim 1 wherein the first end wall has a polygonal external shape.

5. A combination as set forth in claim 1 further comprising a groove in the first end wall for reducing weight of the body.

6. A combination as set forth in claim 1 wherein said external surface of the belt-guiding section extends smoothly and continuously from the second end wall.

7. A combination as set forth in claim 6 further comprising a smooth and convex transition between said external surface of the belt-guiding section and said second end wall.

8. A combination as set forth in claim 1 wherein the body is made primarily of zinc.

9. A combination as set forth in claim 1 further wherein said internal passage has a chamfered end adjacent the internal surface of the belt-guiding section.

10. A combination as set forth in claim 1 wherein the conical inner face of the second end wall has a first slope, said external surface has a second slope, and the second slope is less than the first slope.

11. A system for transmitting power to a belt-driven device, comprising:
    an electric motor;
    a drive shaft connected to the motor for rotation on an axis;
    a pulley mounted on the drive shaft; and
    an endless belt engaging the pulley and supported for transmitting power to said device;
    wherein the pulley has a belt-driving section configured for engagement by the belt and a belt-guiding section integral with the belt-driving section, said belt-driving section including a hub and at least a first end wall having a conical inner face, said belt-guiding section extending from the conical inner face of the first end wall, and having a conical external surface and an internal surface which is substantially free of reinforcing members and defines a hollow, cup-shaped interior free from structure within the interior, the pulley further having an internal passage for receiving the drive shaft to mount the pulley on the shaft with the shaft extending though the passage, the shaft further extending through the interior of the belt-guiding section without contacting any structure therein.

12. A system as set forth in claim 11 wherein the internal passage has screw threads.

13. A system as set forth in claim 11 wherein the internal passage has at least one spline.

14. A system as set forth in claim 13 wherein the shaft is generally cylindric, solid, and free from deformation.

15. A system as set forth in claim 11 further comprising a second end wall on the belt-driving section.

16. A system as set forth in claim 15 wherein the second end wall has a polygonal external shape.

17. A system as set forth in claim 15 further comprising a groove in the second end wall for reducing weight of the pulley.

18. A system as set forth in claim 15 wherein said external surface of the belt-guiding section extends smoothly and continuously from the first end wall.

19. A system as set forth in claim 18 further comprising a smooth and convex transition between said external surface of the belt-guiding section and said second wall.

20. A system as set forth in claim 11 wherein the pulley is made primarily of zinc.

* * * * *